US011014008B2

United States Patent
Goslin et al.

(10) Patent No.: US 11,014,008 B2
(45) Date of Patent: May 25, 2021

(54) SYSTEMS AND METHODS FOR GAME PROFILE DEVELOPMENT BASED ON VIRTUAL AND/OR REAL ACTIVITIES

(71) Applicant: Disney Enterprises, Inc., Burbank, CA (US)

(72) Inventors: Michael P. Goslin, Los Angeles, CA (US); Jonathan R. Hsu, Burbank, CA (US); Corey D. Drake, Burbank, CA (US); Tritia Medrano, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 113 days.

(21) Appl. No.: 16/366,456

(22) Filed: Mar. 27, 2019

(65) Prior Publication Data
US 2020/0306647 A1 Oct. 1, 2020

(51) Int. Cl.
*A63F 13/79* (2014.01)
*A63F 13/798* (2014.01)
*A63F 13/65* (2014.01)
*A63F 13/822* (2014.01)
*A63F 13/69* (2014.01)
*G06T 19/00* (2011.01)

(52) U.S. Cl.
CPC ............ *A63F 13/79* (2014.09); *A63F 13/65* (2014.09); *A63F 13/798* (2014.09); *A63F 13/822* (2014.09); *A63F 13/69* (2014.09); *G06T 19/006* (2013.01)

(58) Field of Classification Search
CPC .......... A63F 13/65; A63F 13/69; A63F 13/79; A63F 13/798; A63F 13/822
See application file for complete search history.

(56) References Cited

U.S. PATENT DOCUMENTS

| | | | | |
|---|---|---|---|---|
| RE34,728 E | * | 9/1994 | Hall-Tipping | ..... A61B 5/02455 463/23 |
| 6,152,856 A | * | 11/2000 | Studor | .................... G16H 20/30 482/8 |
| 6,162,123 A | | 12/2000 | Woolston | |
| 6,817,979 B2 | * | 11/2004 | Nihtila | ................. A61B 5/0002 128/897 |

(Continued)

FOREIGN PATENT DOCUMENTS

CN 109068161 12/2018

OTHER PUBLICATIONS

Dictionary.com, Defintion of lightsaber, 2019, Dictionary.com, pp. 1-2 (Year: 2019).

(Continued)

*Primary Examiner* — William H McCulloch, Jr.
(74) *Attorney, Agent, or Firm* — Esplin & Associates, PC

(57) ABSTRACT

Systems and methods to facilitate game profile development based on virtual and real activities of users are described herein. A user may perform virtual and/or real activities in order to develop a game profile so that the user can play one or more games where the game profile may be implemented. Users may be motivated to perform the virtual and/or real activities to develop the game profiles and show off and/or test their developed game profiles. The one or more games where the game profile may be implemented may be specific to one or more geo-graphic locations.

20 Claims, 4 Drawing Sheets

(56) References Cited

U.S. PATENT DOCUMENTS

| | | | | |
|---|---|---|---|---|
| 7,128,693 | B2* | 10/2006 | Brown | A63F 13/798 482/8 |
| 7,402,105 | B1* | 7/2008 | Hutter | A63F 13/12 463/42 |
| 7,719,563 | B2 | 5/2010 | Richards | |
| 7,765,111 | B2* | 7/2010 | Brown | A61B 5/6896 705/2 |
| 8,016,680 | B1* | 9/2011 | Hutter | A63F 13/67 463/42 |
| 8,506,396 | B1* | 8/2013 | Snyder | G16H 20/30 463/31 |
| 8,597,121 | B2* | 12/2013 | Andres Del Valle | A63F 13/212 463/36 |
| 8,612,363 | B2* | 12/2013 | Karkanias | A63F 13/65 706/11 |
| 9,101,837 | B1* | 8/2015 | Snyder | A63F 13/212 |
| 9,364,746 | B2* | 6/2016 | Chudley | A63F 13/10 |
| 9,931,539 | B1* | 4/2018 | de Pablos | A63B 69/201 |
| 9,972,138 | B2 | 5/2018 | Goslin | |
| 10,223,836 | B2 | 3/2019 | Goslin | |
| 10,300,372 | B2 | 5/2019 | Goslin | |
| 10,304,251 | B2 | 5/2019 | Pahud | |
| 10,481,680 | B2 | 11/2019 | Panec | |
| 10,546,431 | B2 | 1/2020 | Hsu | |
| 10,587,834 | B2 | 3/2020 | Goslin | |
| 2002/0024675 | A1 | 2/2002 | Foxlin | |
| 2004/0002634 | A1* | 1/2004 | Nihtila | A61B 5/0002 600/300 |
| 2004/0077462 | A1* | 4/2004 | Brown | A63F 13/00 482/8 |
| 2005/0101845 | A1* | 5/2005 | Nihtila | A61B 5/0002 600/300 |
| 2007/0126700 | A1 | 6/2007 | Wright | |
| 2007/0252815 | A1 | 11/2007 | Kuo | |
| 2008/0039206 | A1* | 2/2008 | Ackley | A63F 13/79 463/40 |
| 2008/0146334 | A1* | 6/2008 | Kil | G16H 50/30 463/36 |
| 2008/0274805 | A1* | 11/2008 | Ganz | A63F 13/822 463/29 |
| 2009/0307611 | A1* | 12/2009 | Riley | G06F 16/435 715/757 |
| 2009/0309891 | A1* | 12/2009 | Karkanias | A63F 13/79 345/581 |
| 2009/0325701 | A1* | 12/2009 | Andres Del Valle | A63F 13/65 463/36 |
| 2010/0261526 | A1 | 10/2010 | Anderson | |
| 2011/0250962 | A1 | 10/2011 | Feiner | |
| 2012/0050535 | A1 | 3/2012 | Densham | |
| 2012/0254749 | A1* | 10/2012 | Downs, III | G16H 40/67 715/706 |
| 2012/0262365 | A1 | 10/2012 | Mallinson | |
| 2012/0327117 | A1 | 12/2012 | Weller | |
| 2013/0042296 | A1 | 2/2013 | Hastings | |
| 2013/0044128 | A1 | 2/2013 | Liu | |
| 2013/0229396 | A1 | 9/2013 | Huebner | |
| 2013/0286004 | A1 | 10/2013 | McCulloch | |
| 2014/0002329 | A1 | 1/2014 | Nishimaki | |
| 2014/0003651 | A1 | 1/2014 | Smoot | |
| 2014/0078517 | A1 | 3/2014 | Ben-Yishai | |
| 2014/0080109 | A1 | 3/2014 | Haseltine | |
| 2014/0104169 | A1 | 4/2014 | Masselli | |
| 2014/0116469 | A1 | 5/2014 | Kim | |
| 2014/0160117 | A1 | 6/2014 | Nehmadi | |
| 2015/0035677 | A1 | 2/2015 | Williams | |
| 2015/0201188 | A1 | 7/2015 | Pritch | |
| 2015/0243286 | A1 | 8/2015 | Goslin | |
| 2015/0248785 | A1 | 9/2015 | Holmquist | |
| 2016/0055677 | A1 | 2/2016 | Kuffner | |
| 2016/0189411 | A1 | 6/2016 | Matsunaga | |
| 2016/0206957 | A1 | 7/2016 | Goslin | |
| 2016/0247324 | A1 | 8/2016 | Mullins | |
| 2016/0253842 | A1 | 9/2016 | Shapira | |
| 2016/0260261 | A1 | 9/2016 | Hsu | |
| 2016/0274662 | A1 | 9/2016 | Rimon | |
| 2016/0299563 | A1 | 10/2016 | Stafford | |
| 2016/0327798 | A1 | 11/2016 | Xiao | |
| 2016/0352930 | A1 | 12/2016 | Fujita | |
| 2017/0087465 | A1 | 3/2017 | Lyons | |
| 2017/0124713 | A1 | 5/2017 | Jurgenson | |
| 2017/0132841 | A1 | 5/2017 | Morrison | |
| 2017/0161561 | A1 | 6/2017 | Marty | |
| 2017/0203225 | A1 | 7/2017 | Goslin | |
| 2017/0213387 | A1 | 7/2017 | Bean | |
| 2017/0228936 | A1 | 8/2017 | Goslin | |
| 2017/0257594 | A1 | 9/2017 | Goslin | |
| 2017/0295229 | A1 | 10/2017 | Shams | |
| 2018/0081439 | A1 | 3/2018 | Daniels | |
| 2018/0173300 | A1 | 6/2018 | Schwarz | |
| 2018/0190017 | A1 | 7/2018 | Mendez | |
| 2018/0204362 | A1 | 7/2018 | Tinsman | |
| 2018/0239144 | A1 | 8/2018 | Woods | |
| 2018/0295324 | A1 | 10/2018 | Clark | |
| 2018/0350056 | A1 | 12/2018 | Cardenas Bernal | |
| 2018/0350118 | A1 | 12/2018 | Bastaldo-Tsampalis | |
| 2018/0365893 | A1 | 12/2018 | Mullins | |
| 2019/0019346 | A1 | 1/2019 | Cuthbertson | |
| 2019/0243446 | A1 | 8/2019 | Panec | |
| 2019/0304191 | A1 | 10/2019 | Hsu | |
| 2019/0329405 | A1 | 10/2019 | Atohira | |
| 2020/0037144 | A1 | 1/2020 | Chen | |
| 2020/0101372 | A1 | 4/2020 | Drake | |
| 2020/0306647 | A1* | 10/2020 | Goslin | A63F 13/69 |
| 2021/0001171 | A1* | 1/2021 | Fung | G06F 3/016 |

OTHER PUBLICATIONS

Hashimoto, Sunao, et al., "Touch Me: An Augmented Realtiy Based Remote Robot Manipulation", The 21st International Conference on Artificial Reality and Telexistence, Nov. 28-30, 2011, Osaka, Japan, The Virtual Relaity Society of Japan, pp. 61-66 (Year: 2011).

Virtual and Augmented Reality, Oct. 2016, Citi GPS: Global Perspectives & Solutions. (128 pages).

* cited by examiner

SYSTEMS AND METHODS FOR GAME PROFILE DEVELOPMENT BASED ON VIRTUAL AND/OR REAL ACTIVITIES

FIELD OF THE DISCLOSURE

The present disclosure relates to systems and methods to facilitate game profile development based on virtual and/or real activities of users.

BACKGROUND

Technology may be leveraged to enable video games and/or aspects thereof to be played out in the real world and involve physical activity. For example, such video games may utilize augmented reality technology. Games may be task-based, where a player executes a task to progress through the game (e.g., leveling up by accumulating accomplishments). Some role-playing games (RPGs), including massively multiplayer online role-playing games (MMORPGs), may involve virtual gameplay where character development may be central to the gameplay. MMORPG players may spend time developing their characters, thereby adding never-ending value to a game and motivating playtime.

SUMMARY

Aspects of the present disclosure relate to systems and methods configured to facilitate game profile development based on virtual and/or real activities of users. A game profile may represent a user in one or more games. A game may be playable in one or more virtual spaces and/or one or more real-world spaces. Gameplay in a combined virtual space and real-world space may comprise an augmented reality game and/or other types of games.

Virtual activities may correspond to gameplay in one or more virtual spaces. Real activities may involve physical activity in one or more real-world spaces. Users may perform activities in one or more virtual spaces and/or one or more real-world spaces in order to develop a game profile. Development may refer to values of one or more profile attributes of the game profile being improved and/or worsened depending on outcome of the activities. The virtual activities may be carried out using a game entity that may represent the user. The real activities may be carried out using one or more monitor devices measuring physical activity. A user may perform the virtual and/or real activities in order to develop the game profile so that the user can play one or more games where the game profile may be implemented, for example, in an augmented reality game and/or other game. The augmented reality game and/or other game may be specific to a geo-graphical location such that the users may be driven to that geo-graphical location to show off and/or test their developed game profile.

The system may include one or more of non-transitory electronic storage, one or more processors configured by machine-readable instructions, and/or other components. The non-transitory electronic storage may be configured to store profile information and/or other information. The profile information may include one or more values for one or more profile attributes of a game profile of a user. By way of non-limiting illustration, the profile information may include one or more of a first value of a first profile attribute, a second value of a second profile attribute, and/or other values of other attributes.

The machine-readable instructions may include one or more computer program components. The one or more computer program components may include one or more of a physical activity component, a virtual activity component, an update component, an implementation component, and/or other components.

The physical activity component may be configured to obtain physical activity information and/or other information. The physical activity information may define one or more values of one or more physical activity attributes of physical activity of a user in a real-world environment. By way of non-limiting illustration, the physical activity information may define a third value of a first physical activity attribute and/or other values of other attributes.

The virtual activity component may be configured to obtain virtual activity information and/or other information. The virtual activity information may define one or more values of one or more virtual activity attributes of virtual activity of the user within one or more virtual spaces. By way of non-limiting illustration, the virtual activity information may define a fourth value of a first virtual activity attribute and/or other values of other attributes.

The update component may be configured to update the profile information based on one or more of the physical activity information, the virtual activity information, and/or other information. by way of non-limiting illustration, the first value of the first profile attribute may be updated based on the third value of the first physical activity attribute. The second value of the second profile attribute may be updated based on the fourth value of the first virtual activity attribute.

The implementation component may be configured to implement a game profile for a user in a game based on updated profile information.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
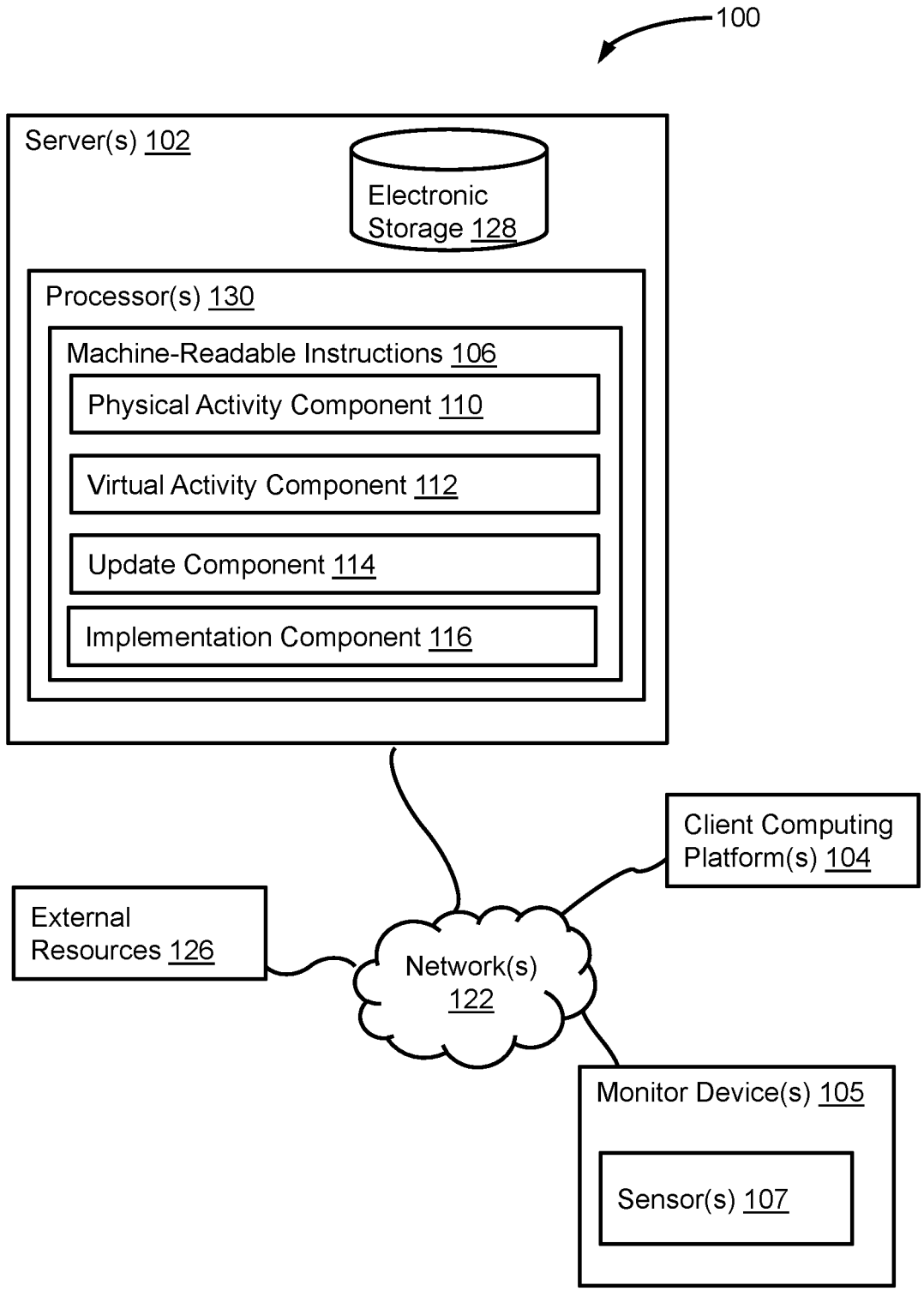
FIG. 1 illustrates a system configured to facilitate game entity development based on virtual and/or real activities of users, in accordance with one or more implementations.

FIG. 1 illustrates a system 100 configured to facilitate game profile development based on virtual and real activities of users. A game profile may represent a user in one or more games. A game may be playable in one or more virtual spaces and/or one or more real-world spaces. Gameplay in a combined virtual space and real-world space may comprise an augmented reality game and/or other types of games.

Virtual activities may correspond to gameplay in one or more virtual spaces. The gameplay in one or more virtual spaces may include one or more of playing a certain level, performing a game task, and/or other gameplay. The virtual activities may be carried out using a game entity that may represent the user. Real activities may involve physical activity in one or more real-world spaces. The real activities may be carried out using one or more monitor devices measuring physical activity. The physical activity may include aspects of one or more of focus, heartrate control, strength training, speed training, and/or other activity.

Users may perform activities in one or more virtual spaces and/or one or more real-world spaces in order to develop game profiles. Development may refer to values of one or more profile attributes of the game profile being improved and/or worsened depending on outcome of the activities. A user may perform the virtual and/or real activities in order to develop the game profile so that the user can play one or more games where the game profile may be implemented, for example, in an augmented reality game and/or other game. The augmented reality game and/or other game may be specific to a geo-graphical location so that the users may be driven to that geo-graphical location to show off and/or test their developed game profile. The geo-graphical location may include one or more of a retail store, a park, an amusement park, and/or other locations.

In some implementations, system 100 may include one or more of one or more servers 102, one or more client computing platforms 104, one or more monitor devices 105, and/or other components.

Server(s) 102 may be configured to communicate with one or more client computing platforms 104, one or more monitor devices 105, and/or other components of system 100 according to a client/server architecture, peer-to-peer architecture, and/or other architectures. Communications may be facilitated through network(s) 122. The network(s) 122 may include wired and/or wireless connections. The network(s) 122 may include the Internet, Bluetooth, USB, and/or other communication networks. It will be appreciated that this is not intended to be limiting and that the scope of this disclosure includes implementations in which components of system 100 may be operatively linked via some other communication media.

Server(s) 102 may include one or more of non-transitory electronic storage 128, one or more physical processors 130 configured by machine-readable instructions 106, and/or other components.

The non-transitory electronic storage 128 may be configured to store profile information and/or other information for one or more users. The profile information for a user may include one or more values for one or more profile attributes of a game profile associated with the user. The game profile may dictate attributes of gameplay for the user in one or more games. In some implementations, profile attributes of a game profile may include one or more of an appearance attribute, a behavior attribute, an ability attribute, and/or other attributes. A value of a given attribute may be used to define the given attribute within a game profile.

In some implementations, an appearance attribute may determine one or more visual aspects of virtual content associated with a user. Virtual content associated with a user may include one or more of a game entity representative of the user (e.g., an avatar), virtual items usable in a game (e.g., a virtual weapon and/or other items), and/or other content. For example, the appearance attribute may be related to one or more of a color, a surface material, a lighting property, and/or other visual aspect.

In some implementations, a value for the appearance attribute may include one or more of a color value defining a color, a surface material value defining an attribute of the surface material, a lighting property value defining the lighting property, and/or any other values defining another visual aspect.

In some implementations, the attribute value for the appearance attribute may be a qualitative value and/or quantitative value. For example, a qualitative color value may include, but is not limited to, "green", "red", "blue", "yellow", "bright green", "dark blue", "neon red", and/or other considerations of qualitative expressions that may be used to define a color of virtual content. In some implementations, a color value may be a quantitative value. A quantitative color value may be related to a quality of the color that may be determined by a numerical value, and/or other considerations. For example, a quantitative color value may be a value on a numerical scale from 1 to 10 related to the brightness of the color (or other attribute). For example, a "1" color value may represent a color being the least bright and "10" being the most bright, and/or other considerations. Quantitative color values may be related to other attributes of color that may be determined based on numerical scale such as hue, richness, contrast, and/or other considerations. Quantitative and/or qualitative color values may be considered in other ways.

In some implementations, a qualitative surface material value defining an attribute of a surface material of a surface may be a description of the surface material, and/or other considerations. For example, a qualitative surface material value may include one or more of "metal", "wood", "plastic", "shiny", "rough", "spikey", "smooth", "bumpy", and/or other considerations of qualitative expressions that may be used to define a surface material of. Qualitative and/or quantitative surface material values may be considered in other ways.

In some implementations, a qualitative lighting property value defining the lighting property of virtual content may be related to how the virtual content is lit and/or emits light, the overall visibility of the virtual content, and/or other considerations. For example, a qualitative lighting property may include one or more of "bright", "brighter", "less bright", "dark", "darker", "less dark", "glow", and/or other considerations of qualitative expressions that may be used to define a lighting property. For example, a "glow" may be associated with a visible "aura" surrounding the virtual content. In some implementations, a quantitative lighting property value may include a numerical value, percentage, and/or scale that is representative of an amount or degree of lighting. For example, a quantitative lighting property value may be a value on a numerical scale from 1 to 10, wherein 1 may correspond to being visualized as a completely black or dark entity and 10 may correspond to having a brightly glowing visible aura in the virtual space, and/or other considerations. Qualitative and/or quantitative lighting property values may be considered in other ways.

In some implementations, a behavior attribute may determine one or more behaviors of virtual content. For example, the behavior attribute may be related to one or more of a speed of a movement (e.g. walking, running, and/or other considerations), a hit reaction (e.g., a visible reaction to offensive attacks), a collection bonus (e.g., a multiplier and/or other bonus associated with the collection of virtual items and/or currencies, resource harvesting, and/or other collection), and/or other behavioral attributes.

In some implementations, a value for the behavior attribute may include one or more of a speed value defining speed, a hit reaction value defining a hit reaction, a collection bonus value defining a multiplier and/or other bonus, and/or other value defining another behavioral attribute. In some implementations, values for the behavior attribute may be qualitative and/or quantitative values.

In some implementations, a qualitative speed value may include one or more of "fast", "slow", "faster", "slower", and/or other considerations of qualitative expressions that may be used to define a speed. In some implementations, a quantitative speed value may include a numerical value, percentage, and/or scale that is representative of the speed. For example, a quantitative speed value may be a value on a numerical scale from 1 to 10, where 1 may be the slowest speed and 10 may be the fastest speed, and/or other considerations. In some implementations, a quantitative speed value may include a numerical value that corresponds to one or more units of measurement for speed. For example, the virtual space may be associated with units of measurement related to a distance traveled over unit time and/or other unit of measurement that may be representative of speed. Qualitative and/or quantitative speed values may be considered in other ways.

In some implementations, a hit reaction value may correspond to responses to offensive "hits" or attacks (e.g., from other users and/or from artificial intelligence-controlled game entities). For example, a qualitative hit reaction value may correspond to one or more of "react", "do not react", "spin", "fall to the ground", "get angry", "get sad", "grow larger", "hide", "run away", "perform [a defensive block]", and/or other considerations of qualitative expressions that may be used to define a hit reaction. In some implementations, a quantitative hit reaction value may include a numerical value that corresponds to a hit reaction. For example, a game entity may have a hit reaction where the game entity spins around a number of times in the virtual space and/or performs a different hit reaction. The number of spins may be determined based on a quantitative hit reaction value, e.g., "3" spins (or other amount). Qualitative and/or quantitative speed values may be considered in other ways.

In some implementations, a collection bonus value may be a qualitative or quantitative value defining a multiplier and/or other value associated with the collection of virtual items and/or currencies (e.g., resource harvesting) and/or other collection. For example, a user may harvest virtual resources within a game that implements a game profile, such as a virtual food, currency, and/or other virtual item. Harvesting virtual resources may require a predetermined amount of time to pass per unit resource harvested before the resource can be collected by the game entity and/or stored in a virtual inventory. In some implementations, a quantitative collection bonus value may be a multiplier such as "2×", "3×", "4×", and/or other value that may be used to define a speed-up of harvesting time by the multiplier value. In some implementations, a collection bonus value may define the harvesting time for individual resources. For example, a collection bonus value may define that the harvest of "virtual corn" (or other virtual item) is "5 minutes" (or other value). Qualitative and/or quantitative collection bonus values may be considered in other ways.

In some implementations, an ability attribute may be related to a skill and/or weapon available for use and/or in use in a game.

In some implementations, a value for the ability attribute may include one or more of a skill value defining a ability of a user and/or game entity, a weapon value defining a weapon available for use, and/or other considerations. The attribute value for the ability attribute may be a qualitative or quantitative value.

In some implementations, a skill value may be an expression related to a skill or ability. For example, a skill value may include "super kick/punch", "high jump", "turbo speed", and/or other considerations of qualitative expressions that may be used to define a skill or ability. Skill values may be quantitative values. Qualitative and/or quantitative skill values may be considered in other ways.

In some implementations, a weapon value may be an expression related to a virtual weapon available for use and/or to be made available for use (e.g., unlocked or provided in a virtual inventory). For example, a weapon value may include "bazooka", "enchanted sword", and/or other considerations of qualitative expressions that may be used to define a weapon that may be used and/or may be made available. Weapon values may be quantitative values. Qualitative and/or quantitative weapon values may be considered in other ways.

As described herein, a game profile may dictate a user's experience in a game where the game profile may be implemented. The game implementing the game profile may be an augmented reality game and/or other game. An augmented reality game may be facilitated through use of a headset worn by a user and/or other hardware and/or software configured to provide views of a virtual space superimposed over views of the real-world. The views of the virtual space may include views of non-player characters, virtual items, and/or other virtual content. The augmented reality game may be single player and/or multiplayer. The augmented reality game may be synchronous between different users. For example, multiple users may be physically present at the same location where the game may be played. In some implementations, different users may be physically present at different locations and presented views of the other users. In some implementations, the augmented reality game may be asynchronous. For example, a user may play the game at one point in time, and another user may join and/or play the game at another point in time. The game may be turn-based. The augmented reality may include the use of other hardware, such as beacons, handheld devices, and/or other components that provide aspects of gameplay. By way of non-limiting illustration, users may hold physical hilts. A headset may present images of a virtual blade such that the virtual blade may be perceived by a user as projecting from a physical hilt. A battle-type game may be carried out using the physical hilts and perceived virtual blades. Although the battle-type augmented reality game is described herein, this is for illustrative purposes only and not to be considered limiting. Other types of games may be played. By way of non-limiting illustration, other types of game may include racing, resource collection, puzzle solving, and/or other games.

It is further noted that although an augmented reality game is described herein with respect to implementation of a game profile, this is for illustrative purposes only and not to be considered limiting. For example, other types of games may implement the game profiles. Other types of games may include games played solely in the physical world and/or solely in a virtual space. A game played in the physical world may include physical game components such as remoted-controlled vehicles, game components controlled via actuators, pulleys, levers and/or other means of physical manipulation, and/or other physical game components. The game components may be controlled via handheld controllers, specialized controllers, and/or other devices and/or techniques for control.

As described herein, a user may perform the virtual and/or real activities in order to develop the game profile so that the user can play one or more games where the game profile may be implemented. Development may refer to values of one or more profile attributes of the game profile being improved and/or worsened depending on outcome of the activities. Users may be motivated to perform the virtual and/or real activities to develop the game profiles and show off and/or test their developed game profiles in the game where the game profiles may be implemented.

A given client computing platform of one or more client computing platforms 104 may include one or more processors configured to execute computer program components. The computer program components may be configured to enable an expert or user associated with the given client computing platform to interface with system 100 and/or external resources 126, and/or provide other functionality attributed herein to client computing platform(s) 104. By way of non-limiting example, the given client computing platform may include one or more of a desktop computer, a laptop computer, a handheld computer, a tablet computing platform, a NetBook, a Smartphone, a gaming console, and/or other computing platforms.

In some implementations, a client computing platform may be configured to execute computer program components configured to enable access to one or more virtual spaces in which virtual activities may be performed. A computer program component may be configured to execute and implement an instance of the virtual space. The instance of the virtual space may be executed to determine state of the virtual space. The state determined and presented may correspond to a location in the virtual space (e.g., location in the game). The view described by the state may correspond, for example, to the location from which the view is taken, the location the view depicts, and/or other locations; a zoom ratio; a dimensionality of objects; a point-of-view; and/or view attributes of the view. One or more of the view attributes may be selectable by a user.

An instance of the virtual space may comprise a simulated space that is accessible by one or more users via the one or more client computing platforms 104 that presents the views of the virtual space. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space and/or surface features of a surface or objects that are "native" to the space. In some instances, the topography may describe a surface (e.g., a ground surface) that runs through at least a substantial portion of the space (e.g., comprising at least part of a virtual terrain). In some instances, the topography may describe a volume with one or more bodies positioned therein (e.g., a simulation of gravity-deprived space with one or more celestial bodies positioned therein). An instance executed by the computer components may be synchronous, asynchronous, and/or semi-synchronous.

The above description of the manner in which state of the virtual space is determined by a computer program component is not intended to be limiting. The computer program component may be configured to express the virtual space in a more limited, or richer, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by a computer program component, one or more users of may control game entities, groups of game entities, simulated physical phenomena (e.g., wind, rain, earthquakes, and/or other phenomena), and/or other elements within the virtual space to interact with the virtual space and/or other users. The game entities may include virtual characters, such as avatars, group entities, and/or other considerations. A given game entity may be controlled by a user with which it is associated. The user-controlled element(s) may move through and interact with the virtual space (e.g., non-user characters in the virtual space, other objects in the virtual space). The user-controlled elements controlled by and/or associated with one or more users may be created and/or customized by the one or more users, based on information received by a given client computing platform, and/or may be based on other information. One or more users of the one or more client computing platforms 104 may have an "inventory" of virtual items, game entities, and/or currency that the one or more users can use (e.g., by manipulation of a virtual character or other user-controlled element, and/or other items) within the virtual space.

A user may participate in the instance of the virtual space by controlling one or more of the available user-controlled game entities in the virtual space. Control may be exercised through control inputs such as entry, selection, and/or commands input by the one or more users. Other users of the virtual space may interact with the one or more users through communications exchanged within the virtual space. Such communications may include one or more of textual chat, instant messages, private messages, voice communications, and/or other communications. Communications may be received and entered by the users via their respective computing platforms. Communications may be routed to and from the appropriate users through network(s) 122 and/or through communications which are external to the system 100 (e.g., text messaging services associated with the users).

The instance of the virtual space and/or an online game that takes place therein may be persistent. That is, the virtual space and/or the game may continue on whether or not individual players are currently logged in and/or participating in the game. A user that logs out of the virtual space and then logs back in some time later may find the virtual space has been changed through the interactions of other players with the virtual space during the time the player was logged out. These changes may include changes to the simulated physical space, changes in the user's inventory, changes in other user's inventories, changes experienced by non-player characters, changes to the virtual items available for use in the game, and/or other changes.

In some implementations, participation in the instance of the virtual space executed by a given client computing platform may generate virtual activity information. The virtual activity information may define one or more values of one or more virtual activity attributes of virtual activity of a user. In some implementations, virtual activity attributes may include attributes of a game entity controlled by a user in the virtual space which may be developed through gameplay in the virtual space. The virtual activity attributes may include one or more attributes that may be same as or similar to the profile attributes and/or may include one or more other attributes specific to gameplay in the virtual space. By way of non-limiting illustration, the virtual activity attributes may include one or more of an appearance attribute, a behavior attribute, an ability attribute, a game level attribute, play frequency attribute, and/or other attributes. One or more of the appearance attribute, the behavior attribute, and/or the ability attribute within the context of virtual activity attributes may describe similar characteristics as that of the profile attributes however within the context of gameplay using a game entity within a virtual space.

In some implementations, a value for the game level attribute may include a qualitative and/or quantitative expression of progress through gameplay. In some implementations, values for the game level attribute may be qualitative and/or quantitative values.

In some implementations, a qualitative expression of game level value may include one or more of "novice", "beginner", "intermediate", "advanced", "expert," and/or other considerations of qualitative expressions that may be used to define a progress through gameplay. The game level value may be expressed with respect to a default progress and/or other value providing relativity. In some implementations, a game level value may include a numerical value, percentage, and/or scale that is representative of the frequency. For example, a game level value may be a value of "1," "2", "3," "4," and/or other value used to define a progress through gameplay. Qualitative and/or quantitative speed values may be considered in other ways.

In some implementations, a value for the play frequency attribute may include a qualitative and/or quantitative expression of frequency of engaging in gameplay in a virtual space. In some implementations, values for the play frequency attribute may be qualitative and/or quantitative values.

In some implementations, a qualitative frequency value may include one or more of "infrequent", "moderately frequent", "frequent", "very frequent", and/or other considerations of qualitative expressions that may be used to define a frequency of gameplay. The qualitative frequency value may be expressed with respect to a default frequency and/or other value providing relativity. In some implementations, a quantitative frequency value may include a numerical value, percentage, and/or scale that is representative of the frequency. For example, a quantitative frequency value may be a value of quantity of times played per unit time, and/or other considerations. Qualitative and/or quantitative speed values may be considered in other ways.

By way of non-limiting illustration, the profile information of a user may include one or more of a first value of a first profile attribute, a second value of a second profile attribute, and/or other values of one or more other profile attributes.

The one or more monitor devices 105 may be configured to monitor physical activity of users. An individual monitor device may comprise a standalone device configured to measure physical activity. In some implementations, an individual monitor device may comprise a wearable device, a handheld device, and/or other device. By way of non-limiting illustration, a monitor device may include one or more of a wristband, a headset, an article of clothing, and/or other device. In some implementations, an individual monitor device may be incorporated into other devices. By way of non-limiting illustration, a monitor may be incorporated into a client computing platform.

An individual monitor device may include one or more sensors 107. Individual sensors of one or more sensors 107 may be configured to generate output signals conveying information usable by system 100 to determine activity of a user. The one or more sensors 107 may include one or more of an image sensor, an orientation sensor, a location sensor, a pressure sensor, a temperature sensor, a light sensor, an audio input sensor, a biometric sensor, and/or other sensors.

An image sensor may be configured to generate output signals conveying image information. The image information may define visual content in the form of one or more images. Images may be defined by pixels and/or other information. Pixels may be characterized by one or more of pixel location, pixel color, pixel transparency, and/or other information. An image sensor may include one or more of charge-coupled device sensor, active pixel sensor, complementary metal-oxide semiconductor sensor, N-type metal-oxide-semiconductor sensor, and/or other image sensor. The image information may facilitate determination of physical activity information described herein via one or more image-based techniques. By way of non-limiting illustration, techniques may include one or more of computer vision, Speeded Up Robust Features (SURF), Scale-invariant Feature Transform (SIFT), Oriented FAST and rotated BRIEF (ORB), Optical Character Recognition (OCR), facial recognition, and/or other techniques.

In some implementations, an orientation sensor may be configured to generate output signals conveying orientation information and/or other information. Orientation information derived from output signals of an orientation sensor may define an orientation of server(s) 102. In some implementations, orientation may refer to one or more of a pitch angle, a roll angle, a yaw angle, heading, pointing direction, and/or other measurements. An orientation sensor may include an inertial measurement unit (IMU) such as one or more of an accelerometer, a gyroscope, a magnetometer, Inclinometers, Electronic nose, Infrared Imagers, Microbolometers, micro-displays (DMD), Digital micro-mirror device, Optical Switches, and/or other devices.

In some implementations, a location sensor may be configured to generate output signals conveying location information and/or other information. Location information derived from output signals of a location sensor may define one or more of a geo-location of the server(s) 102, an elevation of server(s) 102, and/or other measurements. A location sensor may include one or more of a GPS, an altimeter, and/or other devices.

A pressure sensor may be configured to generate output signals conveying pressure information and/or other information. Pressure information derived from output signals of a pressure sensor may define a force per unit area imparted to the pressure sensor. A pressure sensor may include one or more of a piezoresistive strain gauge, a capacitive pressure sensor, an electromagnetic pressure sensor, a piezoelectric sensor, a strain-gauge, and/or other pressure sensors.

A temperature sensor may be configured to generate output signals conveying temperature information and/or other information. Temperature information derived from output signals of a temperature sensor may define one or more of a temperature at the temperature sensor, temperature within a threshold range of the temperature sensor, and/or other measure of temperature. A temperature sensor may include one or more of a thermocouples, a resistive temperature Measuring devices, an infrared sensor, a bimetallic device, a thermometer, and/or other temperature sensors.

A light sensor may be configured to generate output signals conveying ambient light information and/or other information. The ambient light information derived from output signals of a light sensor may define intensity and/or presence (or absence) of light or other electromagnetic radiation incident on the light sensor. A light sensor may include one or more of a photodiode, an active-pixel sensor, photovoltaic, and/or other sensors.

An audio input sensor may be configured to receive audio input. An audio input sensor may include a sound transducer and/or other sensor configured to convert sound (e.g., air pressure variation) into an electrical signal. By way of non-limiting illustration, an audio input sensor may include a microphone.

A biometric sensor may be configured to generate output signals conveying biometric information. The biometric information derived from output signals of a biometric sensor may convey biometric readings specific to a user. A biometric reading may include one or more of brainwave activity, body temperature, heart rate, eye movement, and/or other readings. By way of non-limiting illustration, a biometric sensors may include one or more of an electroencephalogram (EEG) sensor, a body temperature sensor, a galvanic skin response sensor, a heart rate sensor, an eye tracking sensor, functional magnetic resonance imaging device (fMRI), transcranial Doppler, magnetoencephalogram, and/or other sensors.

In some implementations, performing physical activity using one or more monitor devices 105 may generate physical activity information. The physical activity information may define one or more values of one or more physical activity attributes of physical activity of the user. The physical activity attribute may include one or more of a focus attribute, a heartrate attribute, a strength attribute, a speed attribute, and/or other attributes.

A value of a focus attribute may convey a level or amount of mental focus of a user. The value of the focus attribute may be obtained from output signals of one or more sensors 107. By way of non-limiting illustration, a sensor may include a biometric sensor conveying brainwave activity of a user. The brainwave activity may include readings of brain waves indicative of calmness and/or focus. In some implementations, the value for the focus attribute may be a qualitative value and/or quantitative value. For example, a qualitative value may include, but is not limited to, "not focused", "moderately focused", "in focus", "highly focused," considerations of qualitative expressions that may be used to define a focus of a user. In some implementations, a value of a focus attribute may be a quantitative value. A quantitative value may be determined by a numerical value, and/or other considerations. For example, a quantitative value may be a value on a sliding numerical scale from 1 to 10 related to the level of focus. For example, a "1" value may represent least focused and "10" may represent most focused, and/or other considerations. Quantitative and/or qualitative values may be considered in other ways.

A value of a heartrate attribute may convey speed and/or rhythm of a user's heartrate. The value of the focus attribute may be obtained from output signals of one or more sensors 107. By way of non-limiting illustration, a sensor may include a biometric sensor conveying the heartrate of the user. In some implementations, the value for the heartrate attribute may be a qualitative value and/or quantitative value. For example, a qualitative value may include, but is not limited to, "slow," "moderate," "fast," and/or considerations of qualitative expressions that may be used to define a heartrate. In some implementations, a value of a heartrate attribute may be a quantitative value. A quantitative value may be determined by a numerical value, and/or other considerations. For example, a quantitative value may be represented by a beats per unit time. Quantitative and/or qualitative values may be considered in other ways.

A value of a strength attribute may convey a level of strength of a user. The value of the strength attribute may be obtained from output signals of one or more sensors 107. By way of non-limiting illustration, a sensor may include a location sensor conveying physical movement of a user over time. The distance traveled, elevation climbed, and/or other information may be indicative of user strength. In some implementations, the value for the strength attribute may be a qualitative value and/or quantitative value. For example, a qualitative value may include, but is not limited to, "weak," "strong," "strongest," and/or considerations of qualitative expressions that may be used to define a strength. In some implementations, a value of a strength attribute may be a quantitative value. A quantitative value may be determined by a numerical value, and/or other considerations. For example, a quantitative value may be a value on a sliding numerical scale from 1 to 10 related to the levels of strength. For example, a "1" value may represent weak and "10" may represent strong, and/or other considerations. Quantitative and/or qualitative values may be considered in other ways.

A value of a speed attribute may convey a running and/or walking speed of a user. The value of the speed attribute may be obtained from output signals of one or more sensors 107. By way of non-limiting illustration, a sensor may include a location sensor conveying physical movement of a user over time from which a speed value may be derived. In some implementations, the value for the speed attribute may be a qualitative value and/or quantitative value. For example, a qualitative value may include, but is not limited to, "slow," "moderate," "fast," and/or considerations of qualitative expressions that may be used to define a speed. In some implementations, a value of a strength attribute may be a quantitative value. A quantitative value may be determined by a numerical value, and/or other considerations. For example, a quantitative value may be represented by distance traveled per unit time. Quantitative and/or qualitative values may be considered in other ways.

It is noted that the above descriptions of physical activity attributes are provided for illustrative purposes only and are not to be considered limiting. For example, physical activity attributes may include other attributes, may be expressed in other ways, and/or may be determined from output signals of one or more other sensors.

In FIG. 1, executing the machine-readable instructions 106 may cause one or more physical processors 130 to facilitate game profile development based on virtual and real activities of users. Machine-readable instructions 106 may include one or more computer program components. The computer program components may include one or more of a physical activity component 110, a virtual activity component 112, an update component 114, an implementation component 116, and/or other computer program components.

The physical activity component 110 may be configured to obtain physical activity information and/or other information. The physical activity information may be derived from output signals from one or more sensors 107 of one or more monitor devices 105, as described herein. The physical activity information may define one or more values of one or more physical activity attributes of physical activity of the user in a real-world environment. By way of non-limiting illustration, the physical activity information may define a third value of a first physical activity attribute.

The virtual activity component 112 may be configured to obtain virtual activity information and/or other information. The virtual activity information may define one or more values of one or more virtual activity attributes of virtual activity of the user within one or more virtual spaces. By way of non-limiting illustration, the virtual activity information may define a fourth value of a first virtual activity attribute and/or other values of other virtual activity attributes.

The update component 114 may be configured to update profile information based on one or more of physical activity information, virtual activity information, and/or other information. Individual ones of the one or more profile attributes may correspond to individual ones of the one or more physical activity attributes and/or individual ones of the virtual activity attributes. The values of physical activity attributes and/or virtual activity attribute may update the values of corresponding profile attributes. By way of non-limiting illustration, the first profile attribute may correspond to one or more of the first physical activity attribute, a second virtual activity attribute, and/or other attributes. The second profile attribute may correspond to one or more of the first virtual activity attribute, a second physical activity attribute, and/or other attributes. Accordingly, values of the first physical activity attribute and the second virtual activity attribute may update values of the first profile attribute. Values of the first virtual activity attribute and the second physical activity attribute may update values the second profile attribute. By way of non-limiting illustration, the first value of the first profile attribute may be updated based on the third value of the first physical activity attribute. By way of non-limiting illustration, the second value of the second profile attribute is updated based on the fourth value of the first virtual activity attribute In some implementations, updating the profile information may include one or more of decreasing and/or increasing individual ones of the one or more values of the one or more profile attributes based on decreases and/or increases of individual ones of one or more values of the one or more physical activity attributes and/or decreases and/or increases of individual ones of the one or more values of the one or more virtual activity attributes. In some implementations, the relationship may be direct and/or inverse. By way of non-limiting illustration, a direct relationship may mean an increase (or decrease) in a value of a physical activity attribute and/or virtual activity attribute may result in an increase (or decrease) in a corresponding value of a profile attribute. By way of non-limiting illustration, an inverse relationship may mean an increase (or decrease) in a value of a physical activity attribute and/or virtual activity attribute may result in a decrease (or increase) in a corresponding value of a profile attribute.

In some implementations, updating the profile information may include matching the values of the profile attributes with the values of the virtual activity attributes and/or physical activity attributes.

In some implementations, correspondences between individual ones of the one or more profile attributes and individual ones of the one or more physical activity attributes and/or individual ones of the virtual activity attributes may be set by an administrator of system 100.

By way of non-limiting illustration, the appearance attribute of the profile attributes may correspond to the appearance attribute of the virtual activity attributes. For example, a color of a virtual weapon achieved in gameplay in a virtual space may update a color value of an appearance attribute of a virtual weapon to be made available in a game implementing the game profile.

By way of non-limiting illustration, the behavior attribute of the profile attributes may correspond to the behavior attribute of the virtual activity attributes. For example, a hit reaction achieved in gameplay in a virtual space may update a value of a hit reaction attribute stored in a game profile.

By way of non-limiting illustration, ability attribute of the profile attributes may correspond to the ability attribute of the virtual activity attributes. For example, a skill value, such as a "super punch" achieved in gameplay in a virtual space may update a skill value of an ability attribute stored in a game profile (e.g., to include the same value).

By way of non-limiting illustration, an ability attribute of the profile attributes may correspond to the strength attribute of the physical activity attributes. For example, increasing strength in the real world may increase a value of an ability attribute.

By way of non-limiting illustration, the behavior attribute of the profile attributes may correspond to the speed attribute of the physical activity attributes. For example, increasing speed in the real world may improve and/or change a value of a behavior attribute, such as collection bonus, in a game profile.

By way of non-limiting illustration, appearance attribute of the profile attributes may correspond to the heartrate attribute of the physical activity attributes. For example, achieving a heartrate over a threshold may cause a virtual weapon available in a game implementing the game profile to turn from blue to red.

The above examples of correspondences are provided for illustrative purposes only and are not to be considered limiting. Instead, an administrator may set correspondences as desired.

The implementation component 116 may be configured to implement the game profiles for the users based on the updates to the game profiles. Implementing the game profiles may include providing access to the update values of the profile attributes in one or more games configured to facilitate gameplay based on the game profiles. In some implementations, implementing the game profiles may require a user to log into a user account storing the game profiles at a location where one or more games may be facilitated. Once accessed, the users may then show off and/or test their developed game profiles.

One skilled in the art may appreciate that one or more implementations of this system described herein may facilitate the development of a game profile of a user which may result in one or more real-world experiences. By way of non-limiting example, the developed game profile of the user may indicate that the user has been practicing mental focus based on a value of a focus attribute corresponding to a value of a profile attribute. When the user is performing mental focus towards, for example, a boulder, the boulder may be activated to "levitate" in response to determining the user's brainwave activity indicates calmness and/or focus via one or more sensors. The boulder may "levitate" based on activating one or more mechanisms in the real world (e.g., levers, pulleys, switches, etc.) in response to the determined brainwave activity of the user to enhance the user's real-world experience based on the developed game profile. In another implementation, for the boulder to "levitate", the user may need to physically break a board with a foot such that real physical activity of the user may result in a real-world experience for the user.

Figure 3:
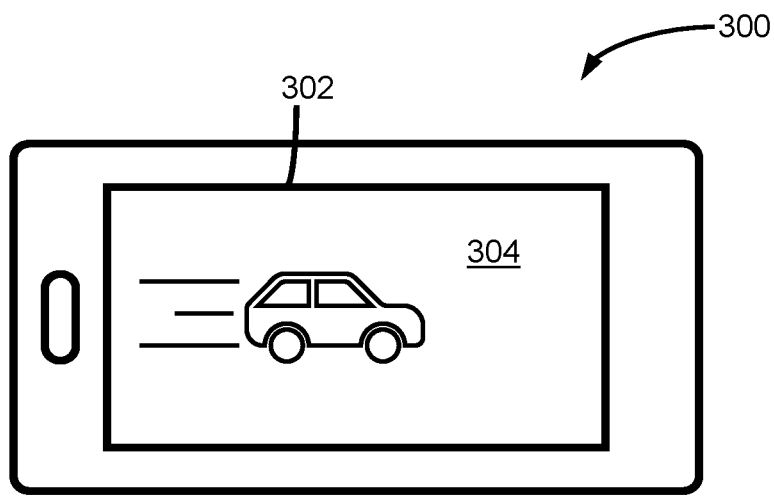
FIG. 3 illustrates an example of a virtual activity, in accordance with one or more implementations.

FIG. 3 illustrates an example of a virtual activity, in accordance with one or more implementations. The virtual activity may include gameplay within a virtual space, such as virtual space 304. The virtual space 304 may be presented on a screen 302 of a client computing platform 300 associated with a user. The virtual space 304 may include a game taking place in the virtual space. Participation in the virtual space 304 executed by client computing platform 300 may generate virtual activity information used to update profile information for the user.

Figure 4:
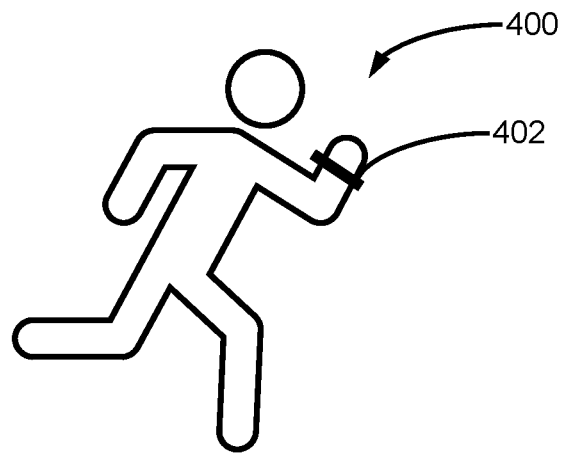
FIG. 4 illustrates an example of real activity, in accordance with one or more implementations.

FIG. 4 illustrates an example of real activity, in accordance with one or more implementations. The real activity may involve physical activity of a user 400, such as running and/or other activity. The physical activity may be monitored via one or more monitor devices such as monitor device 402. The monitor device 402 may include one or more sensors configured to measure the physical activity. By way of non-limiting illustration, the monitor device 402 may measure one or more of speed, heartrate, perspiration, brainwave activity, and/or other measurements. Performing the physical activity using monitor device 402 may generate physical activity information used to update profile information for the user 400.

Figure 5:
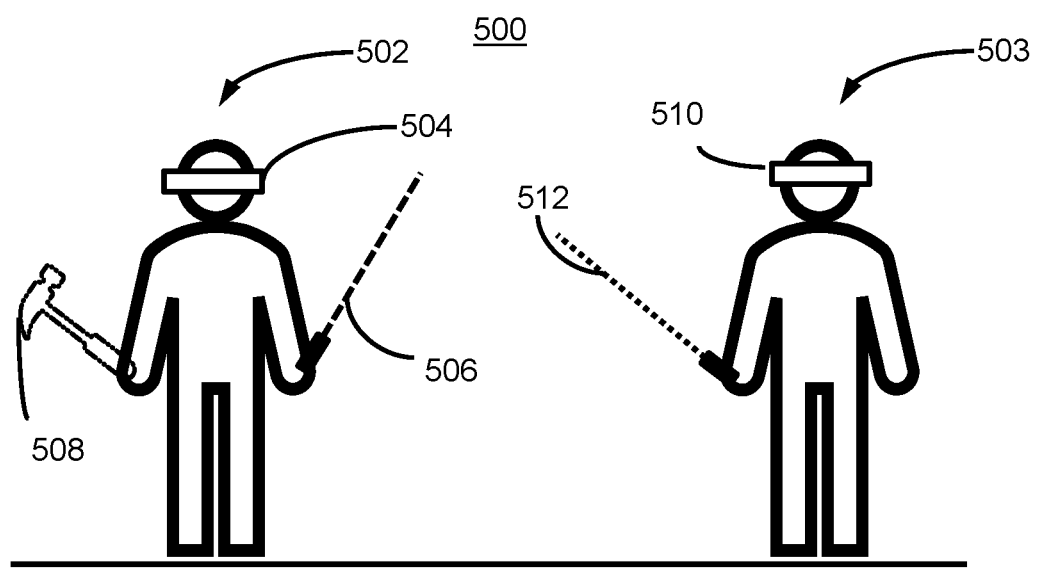
FIG. 5 shows an example of gameplay based on implementation of a game profile, in accordance with one or more implementations.

FIG. 5 shows an example an environment 500 where gameplay may take place. The gameplay may be based on implementation of individual game profiles of the individual users. By way of non-limiting illustration, the environment 500 may be an augmented reality space. The users may wear augmented reality headsets and/or utilize other hardware. The users may include one or more of a first user 502 having a first headset 504, a second user 503 having a second headset 510, and/or other users. The individual users may be associated with individual game profiles. The individual game profiles may have been individually developed and thus may include different values of the profile attributes resulting in different experiences by the different users. By way of non-limiting illustration, a first game profile may cause a virtual weapon 506 of the first user 502 to exhibit a first color while a second game profile of the second user 503 may cause a virtual weapon 512 of the second user to exhibit a second color different from the first. Further, the first game profile may cause the first user 502 to have a second weapon 508 made available to them which may or may not be made available to the second user 503 by virtue of the first game profile being different than the second game profile.

Returning to FIG. 1, in some implementations, server(s) 102, client computing platform(s) 104, and/or external resources 126 may be operatively linked via one or more electronic communication links. For example, such electronic communication links may be established, at least in part, via a network 122 such as the Internet, Bluetooth, and/or other networks. It will be appreciated that this is not intended to be limiting, and that the scope of this disclosure includes implementations in which server(s) 102, one or more client computing platform(s) 104, and/or other components may be operatively linked via some other communication media.

External resources 126 may include sources of information outside of system 100, external entities participating with system 100, providers of virtual content, and/or other resources. In some implementations, some or all of the functionality attributed herein to external resources 126 may be provided by resources included in system 100.

Illustration of one or more processors 130 in FIG. 1 is not intended to be limiting. The one or more processors 130 may include a plurality of hardware, software, and/or firmware components operating together to provide the functionality attributed herein to one or more processors 130. For example, one or more processors 130 may be implemented by a cloud of computing platforms operating together as one or more processors 130.

Electronic storage 128 may comprise non-transitory storage media that electronically stores information. The electronic storage media of electronic storage 128 may include one or both of system storage that is provided integrally (i.e., substantially non-removable) with one or more processors 130 and/or removable storage that is removably connectable to one or more processors 130 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 120, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 110, 112, 114, 116, and/or other components. Processor(s) 130 may be configured to execute components 110, 112, 114, 116, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 110, 112, 114, and 116 are illustrated in FIG. 1 as being implemented within a single processing unit, in implementations in which processor(s) 130 includes multiple processing units, one or more of components 110, 112, 114, and/or 116 may be implemented remotely from the other components. The description of the functionality provided by the different components 110, 112, 114, and/or 116 described below is for illustrative purposes, and is not intended to be limiting, as any of components 110, 112, 114, and/or 116 may provide more or less functionality than is described. For example, one or more of components 110, 112, 114, and/or 116 may be eliminated, and some or all of its functionality may be provided by other ones of components 110, 112, 114, and/or 116. As another example, processor(s) 130 may be configured to execute one or more additional components that may perform some or all of the functionality attributed below to one of components 110, 112, 114, and/or 116.

Figure 2:
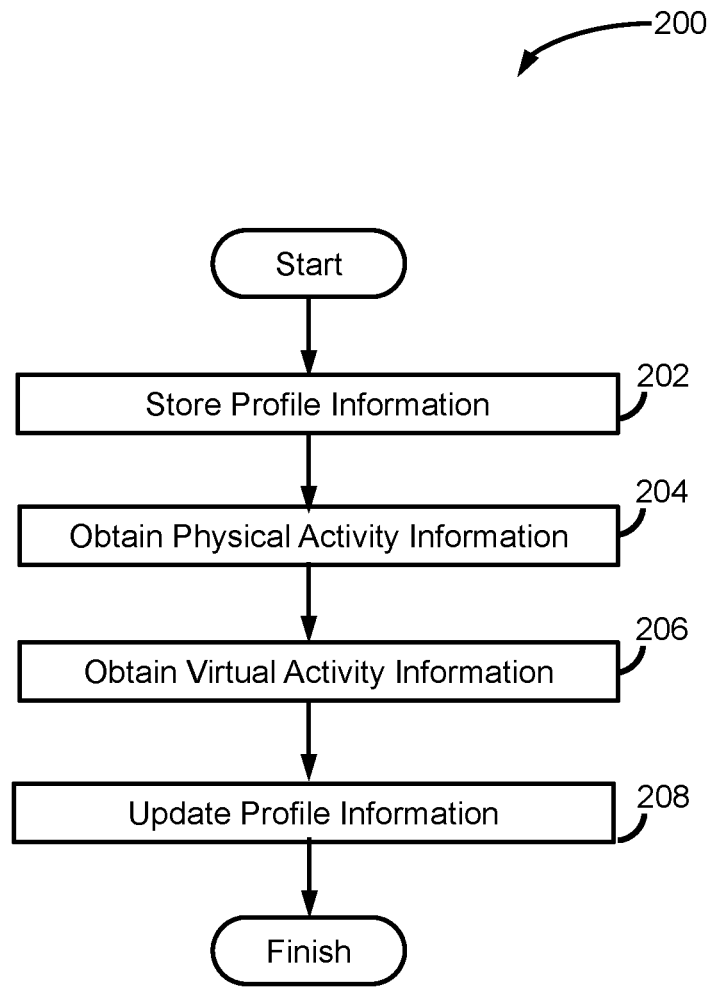
FIG. 2 illustrates a method to facilitate game entity development based on virtual and/or real activities of users, in accordance with one or more implementations.

FIG. 2 illustrates a method 200 to facilitate game profile development based on virtual and/or real activities of users, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing profile information. The profile information may include one or more values for one or more profile attributes of a game profile of a user. By way of non-limiting illustration, the profile information may include one or more of a first value of a first profile attribute, a second value of a second profile attribute, and/or other information. Operation 202 may be performed using non-transitory electronic storage the same as or similar to electronic storage 128 (shown in FIG. 1 and described herein).

An operation 204 may include obtaining physical activity information. The physical activity information may define one or more values of one or more physical activity attributes of physical activity of the user in a real-world environment. By way of non-limiting illustration, the physical activity information may define a third value of a first physical activity attribute and/or other information. Operation 204 may be performed by one or more hardware processors configured by machine-readable instructions including a component that is the same as or similar to physical activity component 110 (shown in FIG. 1 and described herein).

An operation 206 may include obtaining virtual activity information. The virtual activity information may define one or more values of one or more virtual activity attributes of virtual activity of the user within one or more virtual spaces. By way of non-limiting illustration, the virtual activity information may define a fourth value of a first virtual activity attribute and/or other information. Operation 206 may be performed by one or more hardware processors configured by machine-readable instructions including a component that is the same as or similar to virtual activity component 112 (shown in FIG. 1 and described herein).

An operation 208 may include obtaining the profile information based on one or more of the physical activity information, the virtual activity information, and/or other information. By way of non-limiting illustration, the first value of the first profile attribute may be updated based on the third value of the first physical activity attribute and/or other information. The second value of the second profile attribute may be updated based on the fourth value of the first virtual activity attribute and/or other information. Operation 208 may be performed by one or more hardware processors configured by machine-readable instructions including a component that is the same as or similar to update component 114 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate game profile development based on virtual and real activities of users, the system comprising:
 non-transitory electronic storage storing profile information, the profile information including one or more values for one or more profile attributes of a game profile of a user, the profile information including a first value of a first profile attribute and a second value of a second profile attribute; and
 one or more physical processors configured by machine-readable instructions to:
  obtain physical activity information, the physical activity information defining one or more values of one or more physical activity attributes of physical activity of the user in a real-world environment, the physical activity information defining a third value of a first physical activity attribute;
  obtain virtual activity information, the virtual activity information defining one or more values of one or more virtual activity attributes of virtual activity of the user within one or more virtual spaces, the virtual activity information defining a fourth value of a first virtual activity attribute; and
  update the profile information based on the physical activity information and the virtual activity information, such that the first value of the first profile attribute is updated based on the third value of the first physical activity attribute, and the second value of the second profile attribute is updated based on the fourth value of the first virtual activity attribute.

2. The system of claim 1, wherein the one or more physical processors are further configured by the machine-readable instructions to:
 obtain output signals from one or more sensors coupled to one or more monitor devices configured to monitor the physical activity of the user such that the physical activity information is derived from the output signals.

3. The system of claim 2, wherein the one or more monitor devices comprise a wearable device.

4. The system of claim 1, wherein individual ones of the one or more profile attributes correspond to individual ones of the one or more physical activity attributes and individual ones of the virtual activity attributes, such that:
   the first profile attribute corresponds to the first physical activity attribute and a second virtual activity attribute, and the second profile attribute corresponds to the first virtual activity attribute and a second physical activity attribute; and
   wherein values of the first physical activity attribute and the second virtual activity attribute update values of the first profile attribute, and values of the first virtual activity attribute and the second physical activity attribute update values the second profile attribute.

5. The system of claim 1, wherein updating the profile information includes decreasing and/or increasing individual ones of the one or more values of the one or more profile attributes based on decreases and/or increases of individual ones of one or more values of the one or more physical activity attributes and/or decreases and/or increases of individual ones of the one or more values of the one or more virtual activity attributes.

6. The system of claim 1, wherein the one or more virtual spaces include a video game played on a client computing platform.

7. The system of claim 1, wherein the one or more physical processors are further configured by the machine-readable instructions to:
   implement the game profile for the user in a game based on the updated profile information.

8. The system of claim 7, wherein the game is an augmented reality game.

9. The system of claim 7, wherein the game is specific to a geo-graphical location.

10. The system of claim 1, wherein:
   the one or more profile attributes include one or more of an appearance attribute, a behavior attribute, or an ability attribute;
   the one or more physical activity attributes include one or more of a focus attribute, a heartrate attribute, a strength attribute, or a speed attribute; and
   the one or more virtual activity attributes include a game level attribute and/or a play frequency attribute.

11. A method to facilitate game profile development based on virtual and real activities of users, the method comprising:
   storing profile information, the profile information including one or more values for one or more profile attributes of a game profile of a user, the profile information including a first value of a first profile attribute and a second value of a second profile attribute;
   obtaining physical activity information, the physical activity information defining one or more values of one or more physical activity attributes of physical activity of the user in a real-world environment, the physical activity information defining a third value of a first physical activity attribute;
   obtaining virtual activity information, the virtual activity information defining one or more values of one or more virtual activity attributes of virtual activity of the user within one or more virtual spaces, the virtual activity information defining a fourth value of a first virtual activity attribute; and
   updating the profile information based on the physical activity information and the virtual activity information, such that the first value of the first profile attribute is updated based on the third value of the first physical activity attribute, and the second value of the second profile attribute is updated based on the fourth value of the first virtual activity attribute.

12. The method of claim 11, further comprising:
   obtaining output signals from one or more sensors coupled to one or more monitor devices configured to monitor the physical activity of the user such that the physical activity information is derived from the output signals.

13. The method of claim 12, wherein the one or more monitor devices comprise a wearable device.

14. The method of claim 11, wherein individual ones of the one or more profile attributes correspond to individual ones of the one or more physical activity attributes and individual ones of the virtual activity attributes, such that:
   the first profile attribute corresponds to the first physical activity attribute and a second virtual activity attribute, and the second profile attribute corresponds to the first virtual activity attribute and a second physical activity attribute; and
   wherein values of the first physical activity attribute and the second virtual activity attribute update values of the first profile attribute, and values of the first virtual activity attribute and the second physical activity attribute update values the second profile attribute.

15. The method of claim 11, wherein updating the profile information includes decreasing and/or increasing individual ones of the one or more values of the one or more profile attributes based on decreases and/or increases of individual ones of one or more values of the one or more physical activity attributes and/or decreases and/or increases of individual ones of the one or more values of the one or more virtual activity attributes.

16. The method of claim 11, wherein the one or more virtual spaces include a video game played on a client computing platform.

17. The method of claim 11, further comprising:
   implementing the game profile for the user in a game based on the updated profile information.

18. The method of claim 17, wherein the game is an augmented reality game.

19. The method of claim 17, wherein the game is specific to a geo-graphical location.

20. The method of claim 11, wherein:
   the one or more profile attributes include one or more of an appearance attribute, a behavior attribute, or an ability attribute;
   the one or more physical activity attributes include one or more of a focus attribute, a heartrate attribute, a strength attribute, or a speed attribute; and
   the one or more virtual activity attributes include a game level attribute and/or a play frequency attribute.

* * * * *